United States Patent
Hammon et al.

(10) Patent No.: US 6,434,300 B1
(45) Date of Patent: Aug. 13, 2002

(54) GRATING WRITING METHOD AND APPARATUS

(75) Inventors: Timothy Edward Hammon, Silver Spring, MD (US); Jonathan Mark Bulman, Cremorne (AU)

(73) Assignee: JDS Uniphase Pty. Ltd., North Ryde (AU)

( * ) Notice: Subject to any disclaimer, the term of this patent is extended or adjusted under 35 U.S.C. 154(b) by 0 days.

(21) Appl. No.: 09/623,337
(22) PCT Filed: Mar. 2, 1999
(86) PCT No.: PCT/AU99/00123
§ 371 (c)(1), (2), (4) Date: Aug. 31, 2000
(87) PCT Pub. No.: WO99/45417
PCT Pub. Date: Sep. 10, 1999

(30) Foreign Application Priority Data

Mar. 2, 1998 (AU) ............................................... PP2092

(51) Int. Cl.⁷ ................................................. G02B 6/34
(52) U.S. Cl. ......................................... 385/37; 385/147
(58) Field of Search ............................. 385/37, 10, 27, 385/147

(56) References Cited

U.S. PATENT DOCUMENTS

| 5,104,209 A |   | 4/1992 | Hill et al. ................... 385/37 X |
| 5,787,213 A |   | 7/1998 | Brownlow ................. 385/37 X |
| 6,043,497 A | * | 3/2000 | Quetel |

FOREIGN PATENT DOCUMENTS

| AU | 4037995 | 6/1996 | ................ 385/37 X |
| DE | 19605062 | 8/1997 | ................ 385/37 X |
| GB | 2298287 | 8/1996 | ................ 385/37 X |
| JP | 07063939 | 3/1995 | ................ 385/37 X |
| WO | WO-9721120 A1 | * | 6/1997 |
| WO | WO-9726570 A1 | * | 7/1997 |
| WO | WO-9808120 A1 | * | 2/1998 |

OTHER PUBLICATIONS

Derwent Abstract Accession No: 98–197318/18, Class V07, JP 10–048450 A (Nippon Telegraph &/Telephone Corp) Feb. 20, 1998 abstract.

Proceedings of the SPIE—The International Society for Optical Engineering, vol. 3075, issued 1997 (Department of Electrical Engineering, Texas University, Arlington, TX, USA), Magnussan, R (et al), "Waveguide–grating couplers for illumination of photonic antennas", pp. 101–108.

* cited by examiner

Primary Examiner—Brian Healy
Assistant Examiner—Kevin S Wood
(74) Attorney, Agent, or Firm—Ladas & Parry

(57) ABSTRACT

The invention provides a method of forming a grating structure on a photosensitive waveguide, involving: moving the waveguide relative to a light source in the longitudinal direction of the grating, directing coherent light from the light source perpendicularly to the direction of relative movement of the waveguide and irradiating spaced-apart regions of the waveguide to form the grating structure, modulating the light and, as a separate step, passing the light through a shutter in its passage between the light source and the waveguide, and controlling the shutter to effect shuttering of the light in synchronisation with the relative movement of the waveguide during formation of the grating structure, in order to control the irradiation of said waveguide so as to keep constant the refractive index in the waveguide core averaged over a full period of said grating structure.

10 Claims, 6 Drawing Sheets

GRATING WRITING METHOD AND APPARATUS

FIELD OF THE INVENTION

The present invention is directed to the creation of grating structures in photosensitive optical waveguides such as optical fibres.

BACKGROUND OF THE INVENTION

Optical fibre communication has seen a tremendous growth in the past several years due to increased traffic flow. One particularly important device that is employed in communication systems, particularly in WDM systems, is the in-fibre Bragg grating. The grating is formed as a periodic modulation in the refractive index along a portion of the length of optical fibre. The periodic modulation is normally created by exposing the fibre to a UV beam or the like, and one method of forming the grating utilises the interference pattern from two interfering beams of light so as to create the grating.

International Patent Application No. PCT/AU96/00782, entitled "Ring Interferometer Configuration for Writing Gratings" discloses one form of vibration insensitive grating writing system which utilises a Sagnac type loop to maintain vibrational stability. Although the implementation of such system has been found to give a relatively high grating performance, it is always desirable to provide for improved grating systems that allow more complex and accurate grating designs to be written and so allow for improved grating performance.

SUMMARY OF THE INVENTION

Broadly defined, the present invention provides a method of forming a grating structure having a predetermined length in a photosensitive waveguide. The method comprises the steps of:

(a) moving the waveguide relative to a light source in the longitudinal direction of the grating, (b) directing coherent light from the light source perpendicularly to the direction of relative movement of the waveguide and irradiating spaced-apart regions of the waveguide to form the grating structure.

(c) modulating the light and, as a separate step, passing the light through a shutter in its passage between the light source and the waveguide, and (d) controlling the shutter to effect shuttering of the light of synchronisation with the relative movement of the waveguide during formation of the grating structure.

The light from the light source may be directed through a phase mask following its passage through the shutter and, so, be controlled to create an interference pattern for irradiating the spaced-apart regions of the waveguide. In forming the interference pattern, two first order beams that are produced by the phase mask may be projected in mutually opposite directions around a Sagnac loop.

In an alternative arrangement, a single beam of light may be focused to irradiate successive regions of the waveguide as the waveguide is moved relative to the light source and the shutter is controlled synchronously to operate and pass light to the fibre. In this case the beam will be focused to a region having a width substantially less than 500 nanometers, this being less than the period of a typical grating.

The fibre may be moved with a substantially constant velocity or at a velocity that is varied so as to produce a chirp in the grating structure.

Also, the duty cycle of the shutter may be controlled during its operation to effect apodisation of the grating structure.

BRIEF DESCRIPTION OF THE DRAWINGS

Notwithstanding any other forms which may fall within the scope of the present invention, preferred forms of the invention will now be described, by way of example only, with reference to the accompanying drawings in which.

DESCRIPTION OF PREFERRED AND OTHER EMBODIMENTS

In a first embodiment, the grating writing techniques previously utilised are further developed for the writing of grating structures on photosensitive waveguides which are moving at a relative velocity to the imaging system which is imaging a grating or other device onto the moving photosensitive waveguide.

Figure 1:
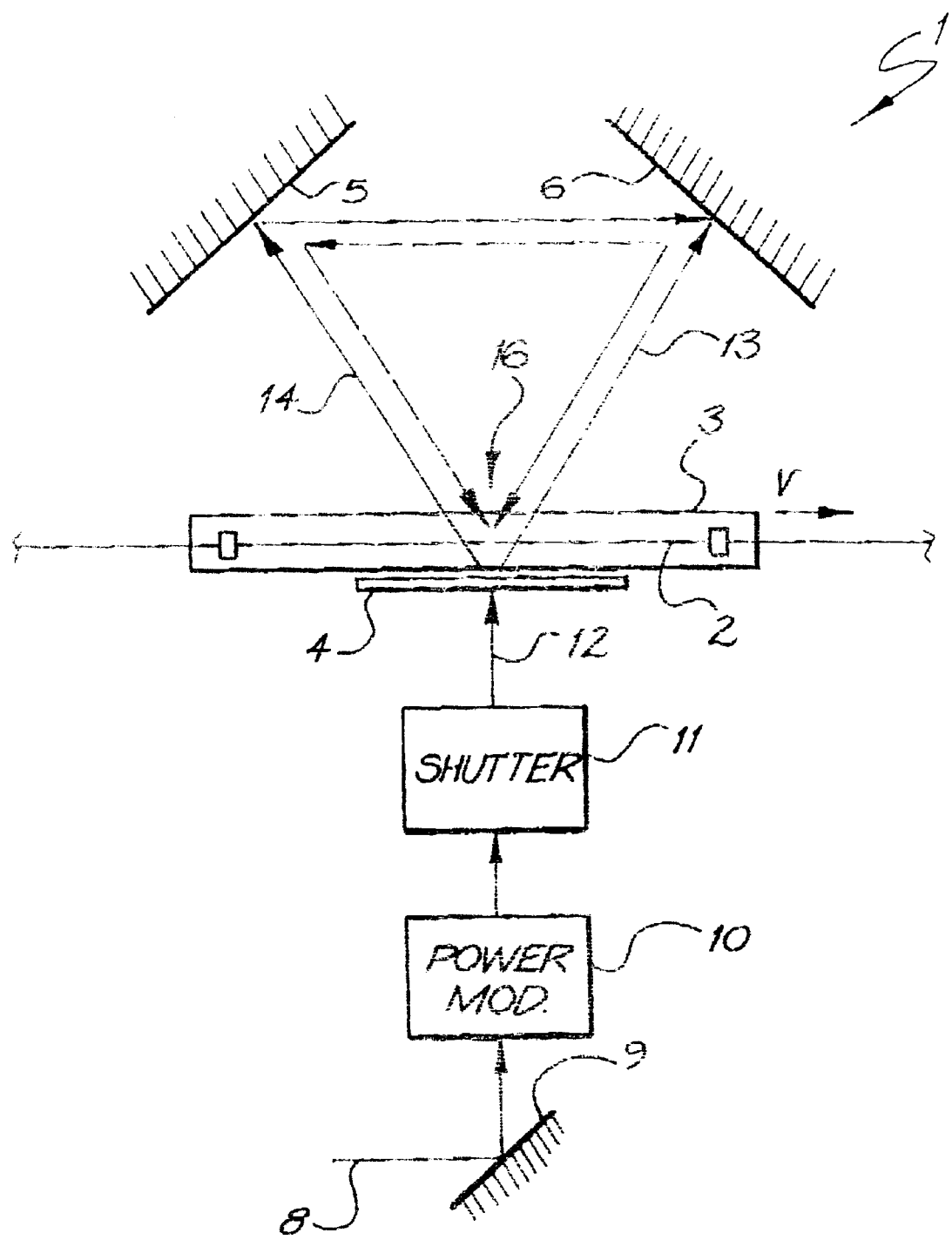
FIG. 1 illustrates a first embodiment of the present invention.

Turning initially to FIG. 1, a fibre 2 upon which a grating needs to be written is mounted on an accurate positioning stage 3 which moves at a velocity V past an imaging area produced by phase mask 4 and mirrors 5 and 6. The fibre 2 is UV sensitive. The arrangement of FIG. 1 uses the low noise Sagnac loop configuration taught by PCT Application No. PCT/AU96/00782 for writing the grating. However it will be evident to the person skilled in the art that the present invention is readily extendible to other forms of interferometric grating writing including those disclosed in U.S. Pat. No. 4,725,110, U.S. Pat. No. 4,807,950, and U.S. Pat. No. 5,377,288.

Light from a UV laser 8 is reflected by a mirror 9 and passes through a controlled power modulator 10 and shutter 11. The light 12 emitted from the shutter 11 is imaged onto the phase mask 4 where it is diffracted so as to produce two first order beams 13, 14 which are reflected around a Sagnac loop by mirrors 5, 6 so as to image an interference pattern at point 16. The shutter 11 is operated at periodic intervals determined by the velocity V of the fibre 2 so as to imprint a constant interference pattern at regular intervals on the fibre 2. The shutter is controlled to operate in a timed relationship with the velocity of movement of the fibre 2 so that the fibre is irradiated by the shuttered light in positions appropriate to formation of the grating.

Figure 2A:
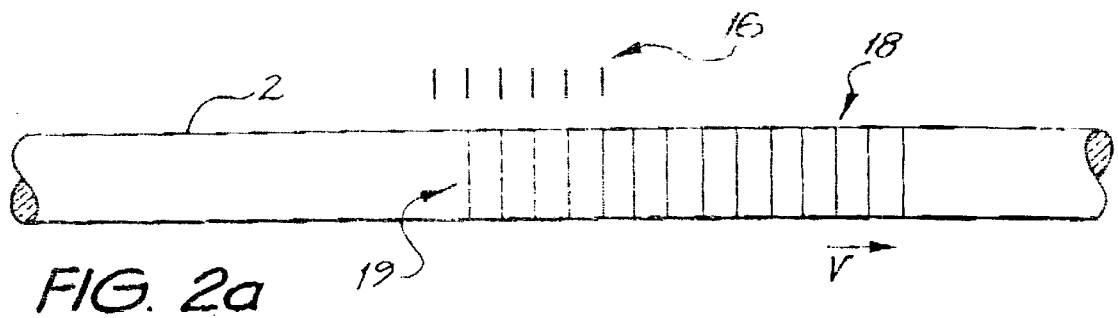
FIG. 2 illustrates the formation of a grating in accordance with the first embodiment.
Figure 2B:
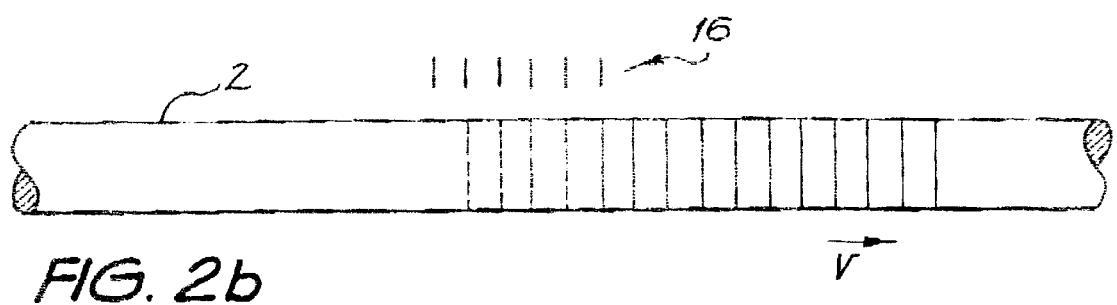
Figure 2C:
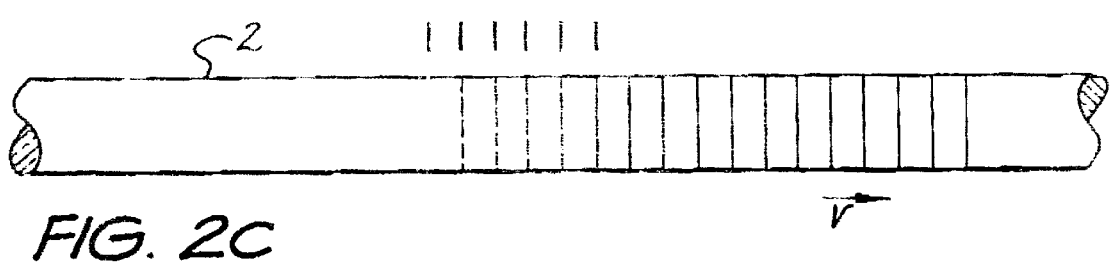
Figure 2D:
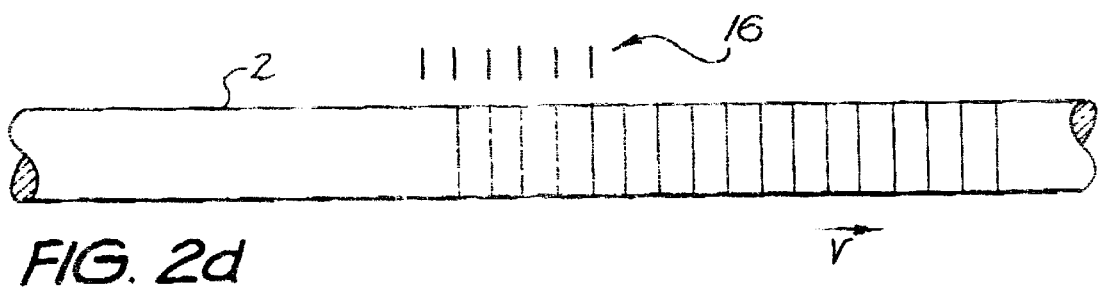

The operation of the shutter will now be illustrated schematically with reference to FIG. 2a to FIG. 2d which illustrate the core of the fibre 2 and the corresponding interference pattern 16. In FIG. 2a, the fibre 2 is considered to be moving with a velocity V and has previously created grating regions 18. The shutter is actuated such that the interference pattern 16 is properly aligned with the regions 18 so as to slowly build up an index modulation 19 with each actuation of the shutter. Hence, a short time later as shown in FIG. 2b, the shutter is again operated with the fibre having moved a distance corresponding t one period in the shutter interval. The process is shown to continue in FIG. 2c and FIG. 2d for subsequent periods so as to build up the fibre structure. By accurately timing the shuttering process, a large scale grating structure is built up.

Figure 3:
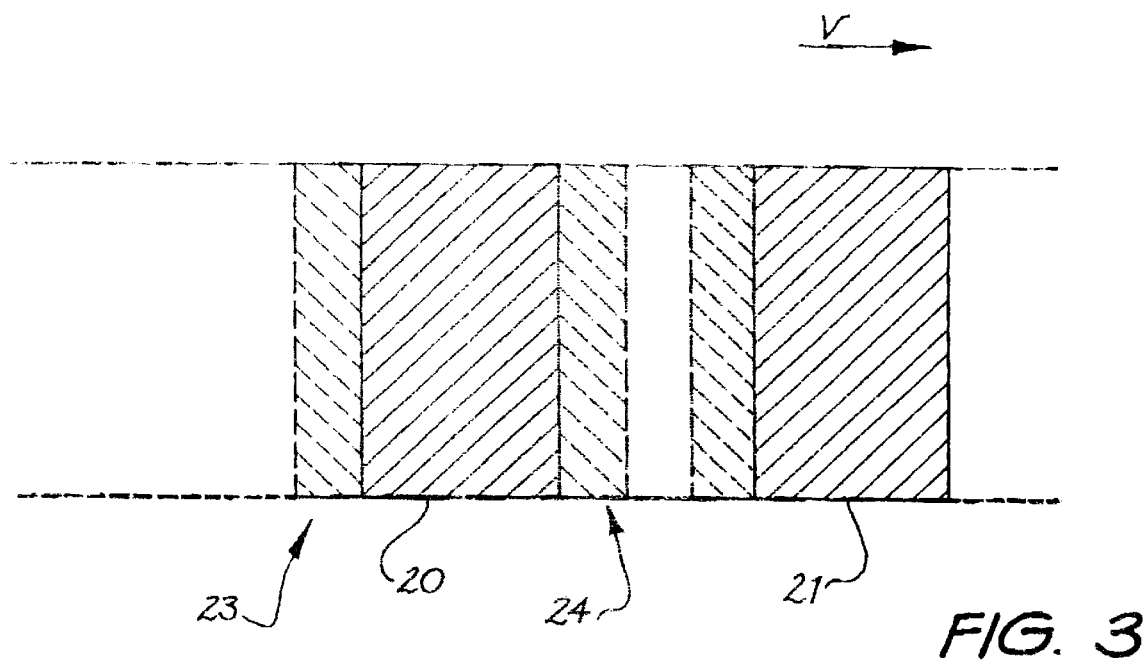
FIG. 3 illustrates the fringe forming and smearing as provided in the first embodiment.

Of course, the process will result in a certain degree of "smear" due to the shutter being open for a finite period of time while the grating is moving past. The smear will result, as illustrated in FIG. 3, in the core fibre having a periodic modulation with a central maximum 20 and 21 with smearing 23, 24 at each side. The degree of smearing will be dependant upon the shutter open period and the velocity V with which the fibre is moving.

The location of the central maximum determines the period of the grating regions or fringes and can be controlled by the timing of the shutter. Proper adjustment of the timing prevents unwanted chirp to be induced in the grating structure. Alternatively, an adjustment of the shutter opening time can be used to write a predetermined chirped grating.

Figure 6:
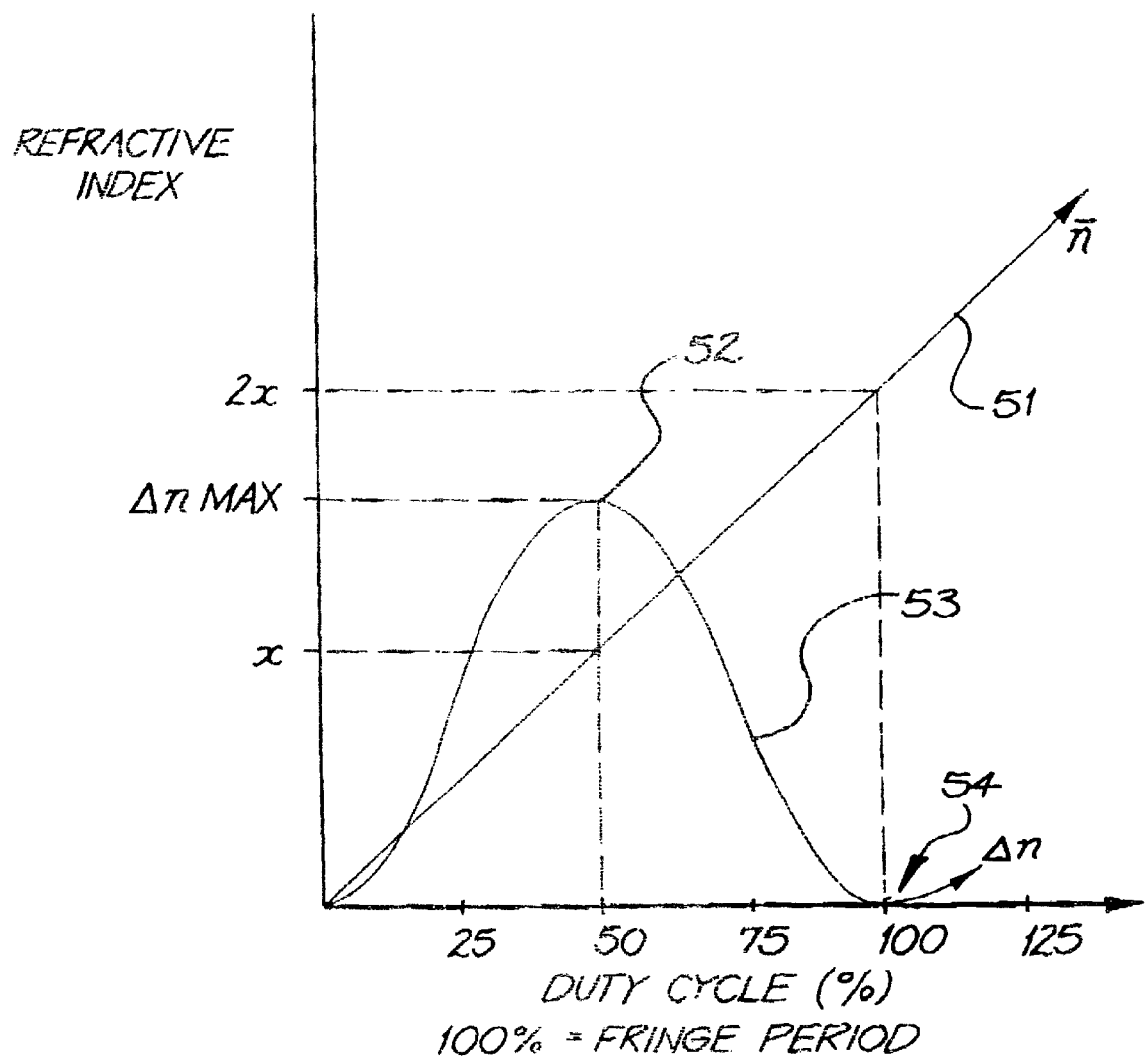
FIG. 6 shows the growth dynamics of the two parameters required to be controlled in an apodised grating including $\Delta n$ and average $(\bar{n})$.

FIG. 6 shows the growth dynamics of the two parameters required to be controlled in an apodised grating including the $\Delta n$ and average n ($\bar{n}$). $\Delta n$ is determined by the required grating design, and adjustment of the exposure is used to keep the ($\bar{n}$) constant. The average ($\bar{n}$) 51 will increase with an increased duty cycle, whereas the $\Delta n$ will increase to a maximum at point 52 which corresponds to 50% duty cycle. Apodisation can be achieved by altering the duty cycle so as to change $\Delta n$.

Average ($\bar{n}$) is kept constant by keeping the area of the curve on a laser power vs. Duty cycle graph constant. Therefore, the cure 53 is utilised and the laser power is halved when going from maximum fringe contrast, 52, to minimum fringe contrast, 54.

FIG. 6 shows the growth dynamics of the two parameters required to be controlled in an apodised grating including the $\Delta n$ (the fringe visibility of the grating imprinted in the fiber) and average n ($\bar{n}$). $\Delta n$ is determined by the required grating design, and adjustment of the exposure is used to keep the ($\bar{n}$) constant. The average ($\bar{n}$) 51 will increase with an increased duty cycle, whereas the $\Delta n$ will increase to a maximum at point 52 which corresponds to 50% duty cycle. Apodisation can be achieved by altering the duty cycle so as to change $\Delta n$.

The output from the shutter 27 impinges on a phase mask 28 wherein it is diffracted to form an interference pattern directly at the back of the phase mask 28. A fibre 29 is positioned close to the phase mask 28 in the interference pattern formed at the back of the phase mask 28 on a stage 30 which is driven at a constant velocity V. The shutter 27 is operated in a manner to permit the grating to be written into the fibre with constant velocity movement of the fibre.

Figure 5:
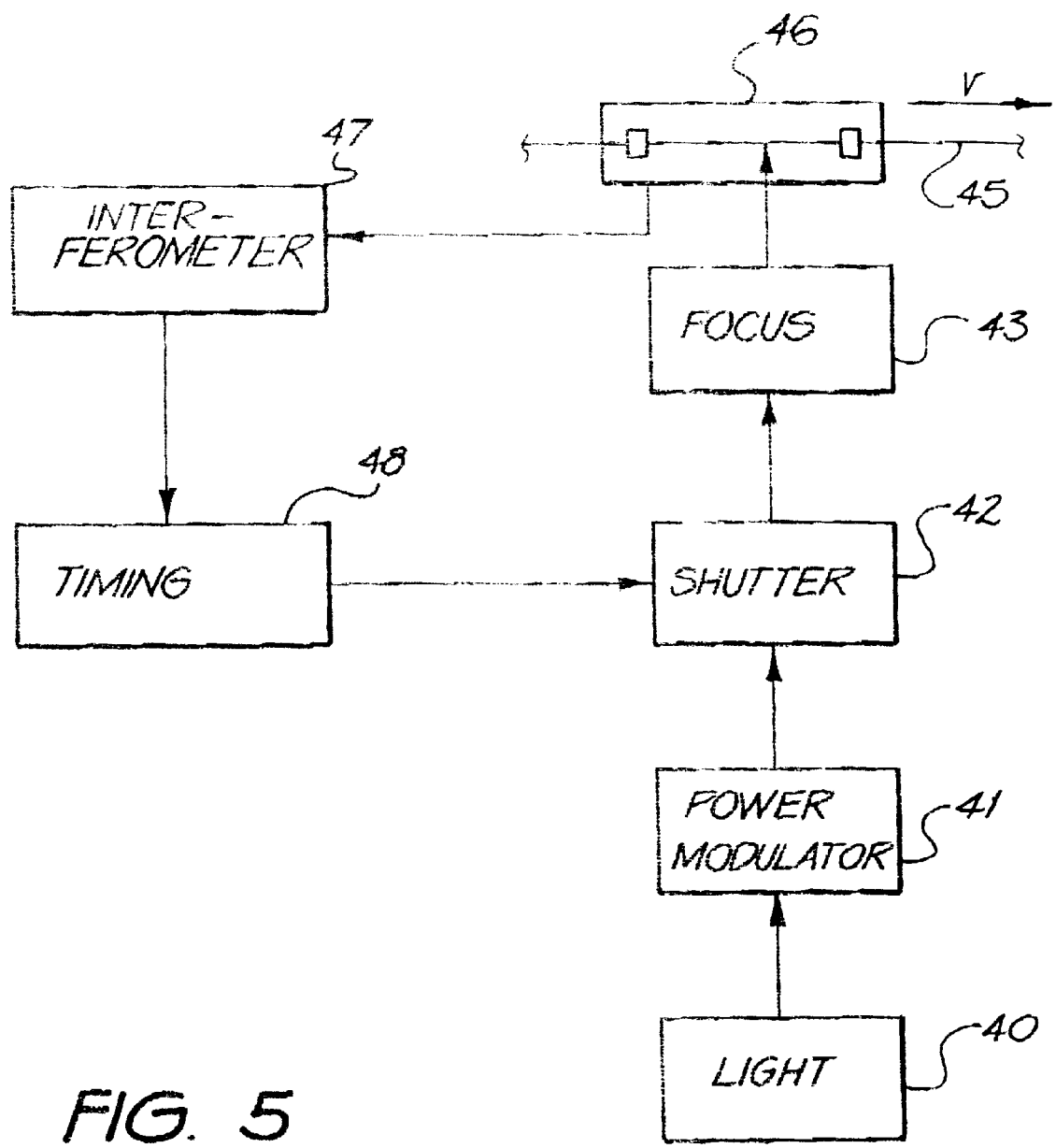
FIG. 5 illustrates a third embodiment of the present invention.

The principle of these embodiments can be further extended to direct writing systems. Such a system is illustrated in FIG. 5. Here a light source 40 is provided which, again, may comprise a UV laser source. The light passes through a power modulator 41 and shutter 42 before being focussed by focussing optics 43 down to a point. The focussing optics 43 are of a high quality necessary to focus the beam to a very fine point in a fibre 45 which is mounted on stage 46 which undergoes a velocity translation at velocity V.

For example, the focussing system may comprise a microscope objective, followed by a spatial filter followed by a second microscope objective arranged to focus the spatial filter output to a small point on the fibre.

The operation of stage 46 may be monitored by an interferometer 47 for its instantaneous position, which is forwarded to a timing unit 48 which in turn controls the shutter 42. By the use of a high speed shutter system 42 it is possible to accurately control the emitted light so that accurate fringe patterns are written into fibre 45 whilst stage 46 moves with a substantially constant velocity V.

It will be appreciated by a person skilled in the art that numerous variations and/or modification may be made to the present invention as shown in the specific embodiments without departing from the spirit or scope of the invention as broadly described. The present embodiments are, therefore, to be considered in all respects to be illustrative and not restrictive.

We claim:

1. A method of forming a grating structure of predetermined length in a photosensitive waveguide, the method comprising the steps of:
   (a) moving the waveguide relative to a light source in the longitudinal direction of the grating,
   (b) directing coherent light from the light source perpendicularly to the direction of relative movement of the waveguide and irradiating spaced-apart regions of the waveguide to form the grating structure,
   (c) modulating the light and, as a separate step, passing the light through a shutter in its passage between the light source and the waveguide, and
   (d) controlling the shutter to effect shuttering of the light in synchronisation with the relative movement of the waveguide during formation of the grating structure.

2. The method as claimed in claim 1 wherein the light source is arranged to emit the light in the uv range of the electromagnetic spectrum.

3. The method as claimed in claim 1 wherein, following its passage through the shutter, the light is directed through a phase mask to create an interference pattern for irradiating the spaced-apart regions of the waveguide.

4. The method as claimed in claim 3 wherein the light is diffracted by the phase mask to produce two first order beams that are controlled to create the interference pattern.

5. The method as claimed in claim 4 wherein creation of the interference pattern is effected by projecting the beams in mutually opposite directions around a Sagnac loop.

6. The method as claimed in claim 1 wherein, following its passage through the shutter, the light is focused to irradiate a region of the waveguide that has a width substantially less than 500 nanometers.

7. The method as claimed in claim 1 wherein the waveguide is moved relative to the light source at a substantially constant velocity.

8. The method as claimed in claim 1 wherein the waveguide is moved relative to the light source at a velocity that is varied so as to produce a chirp in the grating structure.

9. The method as claimed in claim 3 and further comprising the step of controlling the duty cycle of the shutter during shuttering to effect apodisation of the grating structure.

10. A waveguide incorporating a grating structure when produced by the method as claimed in any one of the preceding claims.

* * * * *

UNITED STATES PATENT AND TRADEMARK OFFICE
CERTIFICATE OF CORRECTION

PATENT NO.   : 6,434,300 B1                                                      Page 1 of 1
DATED        : August 13, 2002
INVENTOR(S)  : Timothy Edward Hammon et al.

Figure 4:
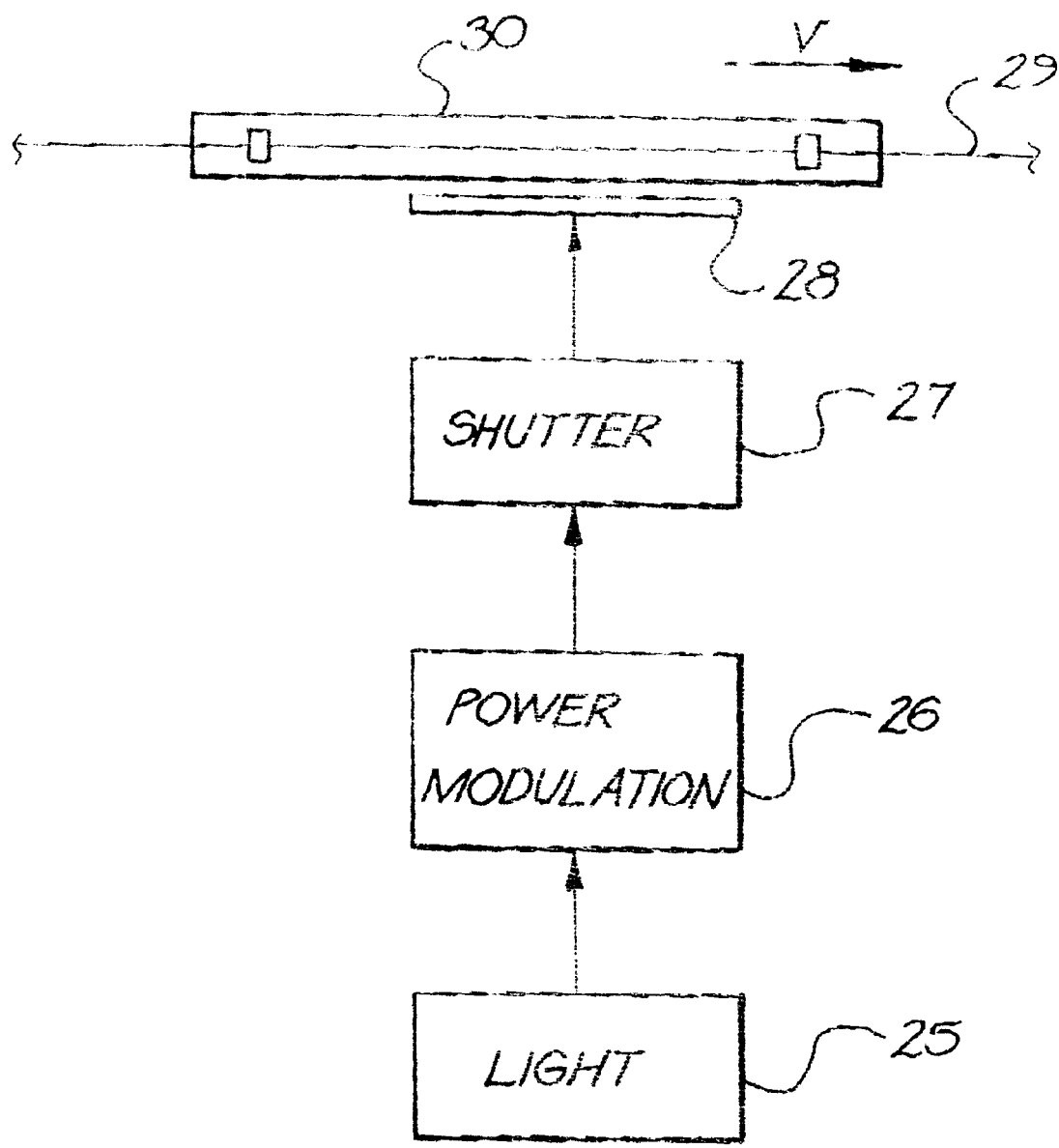
FIG. 4 illustrates a second embodiment of the present invention.

It is certified that error appears in the above-identified patent and that said Letters Patent is hereby corrected as shown below:

<u>Column 3,</u>
Delete lines 36 to 45, and insert -- A number of refinements to the arrangement of Fig. 1 are possible. For example, the instantaneous position of the constant velocity moving stage 3 can be interferometrically determined and referred to a computer system for determining the appropriate frequency control of the shutter 11. Furthermore, the Sagnac loop can be dispensed with. Such an arrangement is illustrated in Fig. 4 wherein the light from a laser system 25 is modulated by a power modulator 26 prior to being passed through a shutter 27. --

Signed and Sealed this

Twenty-fifth Day of March, 2003

JAMES E. ROGAN
*Director of the United States Patent and Trademark Office*